US012662169B2

(12) United States Patent
Hashimoto et al.

(10) Patent No.: US 12,662,169 B2
(45) Date of Patent: Jun. 23, 2026

(54) VEHICLE CONTROL DEVICE, STORAGE MEDIUM STORING COMPUTER PROGRAM, AND METHOD FOR AUTOMATIC VEHICLE CONTROL WITH AUTOMATIC CONTROL PROHIBITED REGION AND CONTROL TRANSFER REGION

(71) Applicant: TOYOTA JIDOSHA KABUSHIKI KAISHA, Toyota (JP)

(72) Inventors: Ryuta Hashimoto, Tokyo-to (JP); Takahiro Seta, Yokohama (JP); Kota Harada, Tokyo-to (JP); Soichi Yoshino, Ichikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 222 days.

(21) Appl. No.: 18/525,994

(22) Filed: Dec. 1, 2023

(65) Prior Publication Data

US 2024/0246577 A1     Jul. 25, 2024

(30) Foreign Application Priority Data

Jan. 20, 2023     (JP) ................................. 2023-007491

(51) Int. Cl.
*B60W 50/14*          (2020.01)
*B60W 30/18*          (2012.01)
(Continued)

(52) U.S. Cl.
CPC .. *B60W 60/0059* (2020.02); *B60W 30/18009* (2013.01); *B60W 40/105* (2013.01);
(Continued)

(58) Field of Classification Search
CPC ....... B60W 60/0059; B60W 30/18009; B60W 40/105; B60W 50/14; B60W 60/0053;
(Continued)

(56) References Cited

U.S. PATENT DOCUMENTS

2008/0221767 A1     9/2008     Ikeda et al.
2016/0347327 A1*     12/2016     Kondo .............. B60W 60/0053
(Continued)

FOREIGN PATENT DOCUMENTS

JP          2000-149188 A          5/2000
JP          2004-102536 A          4/2004
JP          2007-062651 A          3/2007

*Primary Examiner* — Jelani A Smith
*Assistant Examiner* — George A Alcorn, III
(74) *Attorney, Agent, or Firm* — Oliff PLC

(57)          ABSTRACT

A vehicle control device has a processor configured to determine whether an automatic control prohibited region is included on a traveling lane, set a control transfer region on the traveling lane before the automatic control prohibited region, determine whether a vehicle passage region on a traveling lane through which the vehicle is scheduled to pass when the vehicle moves between lanes includes at least part of the control transfer region, and newly set the automatic control prohibited region to include the vehicle passage region, wherein the control transfer region is newly set by shortening a length of the control transfer region so that the control transfer region is not included in the vehicle passage region, when the vehicle passage region includes at least part of the control transfer region and the control transfer region satisfies a predetermined condition.

6 Claims, 12 Drawing Sheets

(51) Int. Cl.
   *B60W 40/105*     (2012.01)
   *B60W 60/00*      (2020.01)
   *B60W 50/00*      (2006.01)

(52) U.S. Cl.
   CPC ........ *B60W 50/14* (2013.01); *B60W 60/0053* (2020.02); *B60W 60/0057* (2020.02); *B60W 2050/007* (2013.01); *B60W 2050/0083* (2013.01); *B60W 2050/146* (2013.01)

(58) Field of Classification Search
   CPC ....... B60W 60/0057; B60W 2050/007; B60W 2050/0083; B60W 2050/146; B60W 2555/60; B60W 2556/50; B60W 30/18163; B60W 60/005; B60W 2552/10; B60W 2556/40
   USPC ........................................................ 701/23
   See application file for complete search history.

(56) References Cited

U.S. PATENT DOCUMENTS

| | | | |
|---|---|---|---|
| 2017/0018189 A1* | 1/2017 | Ishikawa .............. | G05D 1/0088 |
| 2019/0011914 A1* | 1/2019 | Park ................. | B60W 60/0057 |
| 2019/0263427 A1* | 8/2019 | Ueno ................... | B60W 30/00 |
| 2020/0257290 A1* | 8/2020 | Hashimoto .......... | G05D 1/0061 |
| 2021/0331709 A1* | 10/2021 | Kim .................... | A61B 5/1172 |

\* cited by examiner

VEHICLE CONTROL DEVICE, STORAGE MEDIUM STORING COMPUTER PROGRAM, AND METHOD FOR AUTOMATIC VEHICLE CONTROL WITH AUTOMATIC CONTROL PROHIBITED REGION AND CONTROL TRANSFER REGION

FIELD

The present disclosure relates to a vehicle control device, to a storage medium storing a computer program for controlling a vehicle, and to a method for controlling a vehicle.

BACKGROUND

An automatic control system mounted in a vehicle creates a navigation route for the vehicle based on the current location of the vehicle, the destination location of the vehicle, and a navigation map. The automatic control system estimates the current location of the vehicle using the map information and controls the vehicle to travel along the navigation route. The automatic control system also controls operation of the vehicle, including its movement between traffic lanes.

An automatic control system may execute an exit into a branching road that branches from a traveling road in which the vehicle is traveling. The vehicle will thus move between lanes, from a lane of the traveling road to a lane of the branching road. (See Japanese Unexamined Patent Publication No. 2007-62651, for example).

SUMMARY

When the vehicle is moving from the lane of the traveling road to the lane of the branching road at the branching location, a "vehicle passage region" through which the vehicle is scheduled to pass, may include part of a control transfer region for transferring driving of the vehicle from automatic control to manual control. This is because when an automatic control prohibited region where driving of the vehicle by automatic control is not permitted is located in the branching road into which the vehicle is entering, then the control transfer region will be set before the automatic control prohibited region.

When part of the control transfer region is included in the vehicle passage region, the automatic control system assesses that the vehicle cannot be safely operated by automatic control, and sets a new automatic control prohibited region so as to include the vehicle passage region. When a new automatic control prohibited region is set so as to include the vehicle passage region, the automatic control system also sets a new control transfer region before the new automatic control prohibited region.

This introduces a problem in that the driver must initiate manual driving of the vehicle in the new control transfer region that has been set before the first control transfer region.

It is an object of the present disclosure to provide a vehicle control device that allows movement of a vehicle between lanes by automatic control in a vehicle passage region, when the vehicle passage region includes part of a control transfer region.

(1) One embodiment of the invention provides a vehicle control device. The vehicle control device has a processor configured to determine whether an automatic control prohibited region where driving of a vehicle by automatic control is not permitted is included on a traveling lane in which the vehicle is traveling, in a predetermined zone from a current location of the vehicle in a traveling direction, set a control transfer region for transferring driving of the vehicle from automatic control to manual control on the traveling lane before the automatic control prohibited region, when it has been determined that the automatic control prohibited region is included on the traveling lane, determine whether a vehicle passage region on a traveling lane through which the vehicle is scheduled to pass when the vehicle moves between lanes includes at least part of the control transfer region, and newly set the automatic control prohibited region so as to include the vehicle passage region, when it has been determined that the vehicle passage region includes at least part of the control transfer region, wherein the control transfer region is newly set by shortening a length of the control transfer region so that the control transfer region is not included in the vehicle passage region, when the vehicle passage region includes at least part of the control transfer region and the control transfer region satisfies a predetermined condition.

(2) In the vehicle control device of (1), it is preferable that the control transfer region has a variable section in which change in length is allowed and a non-variable section in which change in length is not allowed, and the predetermined condition is that the length of the variable section can be shortened so that the control transfer region is not included in the vehicle passage region.

(3) In the vehicle control device of (1), it is preferable that the control transfer region has a control transfer notification region in which the driver is notified that driving of the vehicle is to be transferred from automatic control to manual control, and a control transfer execution region in which execution is carried out for transfer of driving of the vehicle from automatic control to manual control, and the predetermined condition is that the length of the control transfer notification region can be shortened so that the control transfer region is not included in the vehicle passage region.

(4) In the vehicle control device of (1), it is preferable that the first setting unit decides the length of the control transfer region based on a speed of the vehicle, and the predetermined condition is that the speed of the vehicle can be changed to a target speed for the vehicle which is decided based on the length of the control transfer region calculated so that the control transfer region is not included in the vehicle passage region, before the vehicle reaches the control transfer region.

(5) According to another embodiment, a storage medium storing a computer program for controlling a vehicle is provided. The computer program for controlling a vehicle causes a processor to execute a process and the process includes determining whether t an automatic control prohibited region where driving of a vehicle by automatic control is not permitted is included on a traveling lane in which the vehicle is traveling, in a predetermined zone from a current location of the vehicle in a traveling direction, setting a control transfer region for transferring driving of the vehicle from automatic control to manual control on the traveling lane before the automatic control prohibited region, when it has been determined that the automatic control prohibited region is included on the traveling lane, determining whether a vehicle passage region on a traveling lane through which the vehicle is scheduled to pass when the vehicle moves between lanes includes at least part of the control transfer region, and newly setting the automatic control prohibited region so as to include the vehicle passage region, when it has been determined that the vehicle passage region includes at least part of the control transfer region, wherein the control transfer region is newly set by shortening a length of the control transfer region so that the control transfer region is not included in the vehicle passage region, when the vehicle passage region includes at least part of the control transfer region and the control transfer region satisfies a predetermined condition.

(6) Another embodiment of the invention provides a method for controlling a vehicle. The method for controlling a vehicle is carried out by a vehicle control device and includes determining whether t an automatic control prohibited region where driving of a vehicle by automatic control is not permitted is included on a traveling lane in which the vehicle is traveling, in a predetermined zone from a current location of the vehicle in a traveling direction, setting a control transfer region for transferring driving of the vehicle from automatic control to manual control on the traveling lane before the automatic control prohibited region, when it has been determined that the automatic control prohibited region is included on the traveling lane, determining whether a vehicle passage region on a traveling lane through which the vehicle is scheduled to pass when the vehicle moves between lanes includes at least part of the control transfer region, and newly setting the automatic control prohibited region so as to include the vehicle passage region, when it has been determined that the vehicle passage region includes at least part of the control transfer region, wherein the control transfer region is newly set by shortening a length of the control transfer region so that the control transfer region is not included in the vehicle passage region, when the vehicle passage region includes at least part of the control transfer region and the control transfer region satisfies a predetermined condition.

The vehicle control device of this disclosure allows movement of the vehicle between lanes by automatic control in the vehicle passage region so that the burden on the driver can be alleviated by newly setting a control transfer region so that the control transfer region is not included in a vehicle passage region when the vehicle passage region includes at least part of the control transfer region.

The object and advantages of the invention will be realized and attained by means of the elements and combinations particularly indicated in the claims. It is to be understood that both the foregoing general description and the following detailed description are exemplary and explanatory and are not restrictive of the invention as claimed.

DESCRIPTION OF EMBODIMENTS

Figure 1:
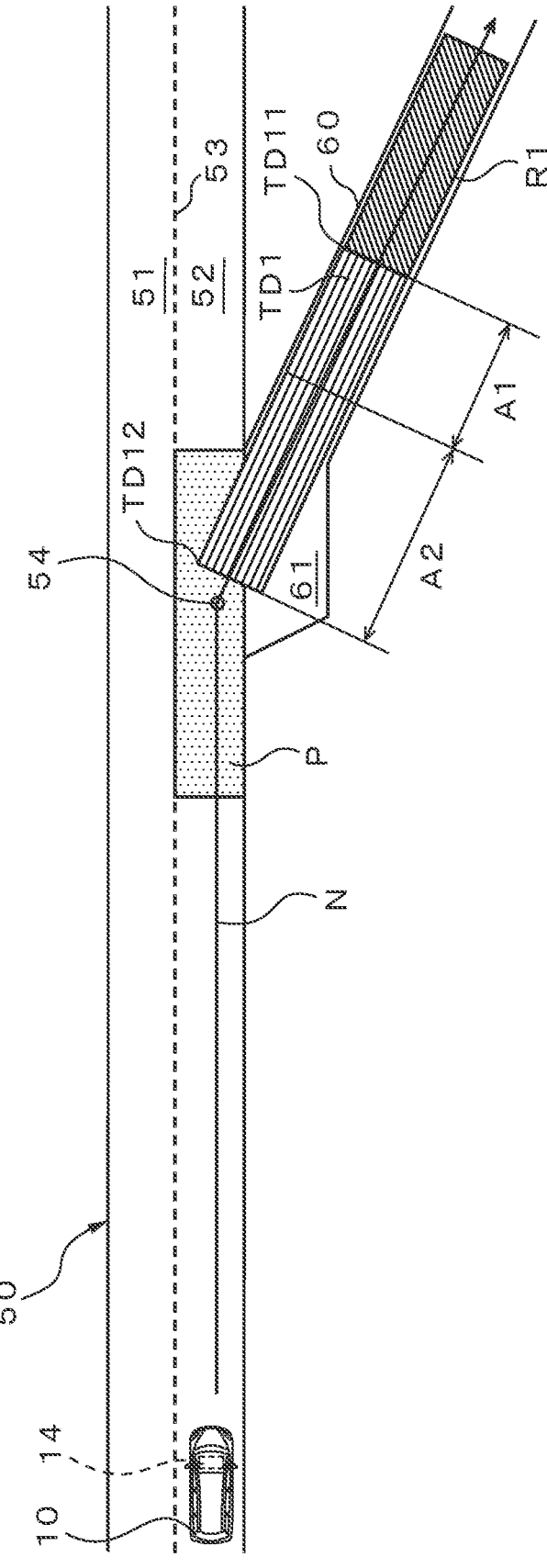
FIG. 1 is a diagram illustrating operation of a traveling lane planning device according to a first embodiment, in overview (1).
Figure 2:
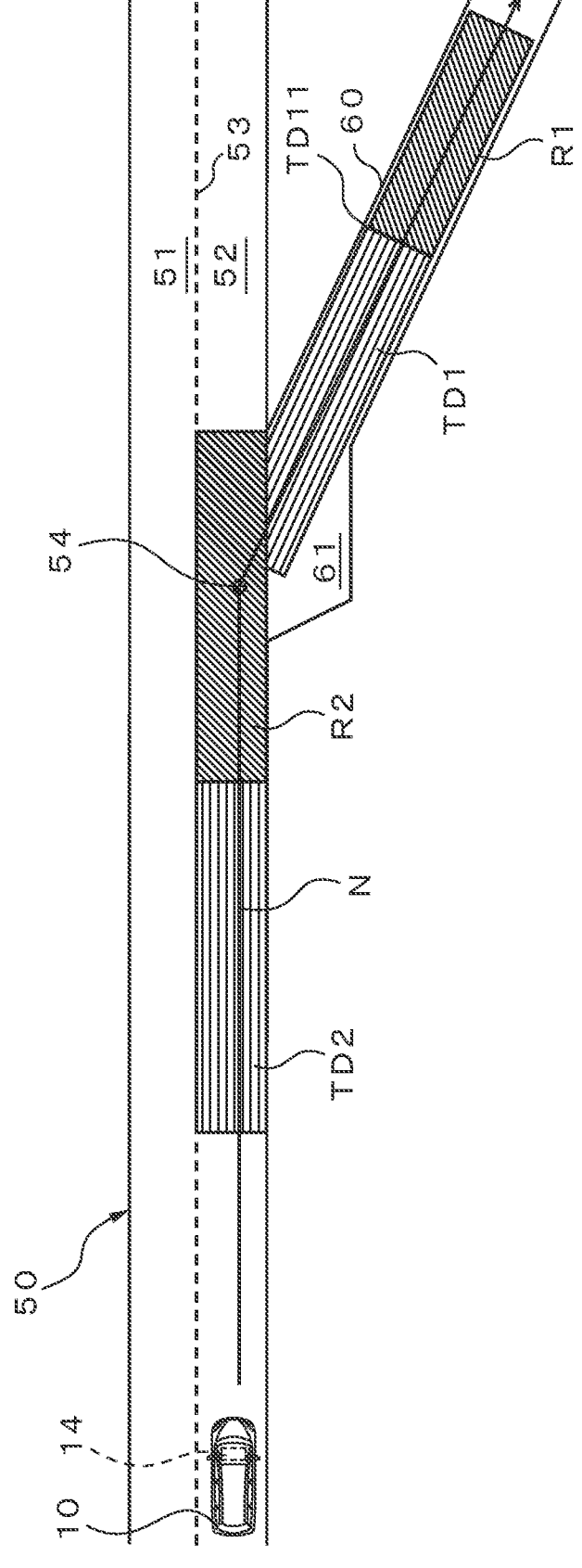
FIG. 2 is a diagram illustrating operation of the traveling lane planning device according to the first embodiment, in overview (2).
Figure 3:
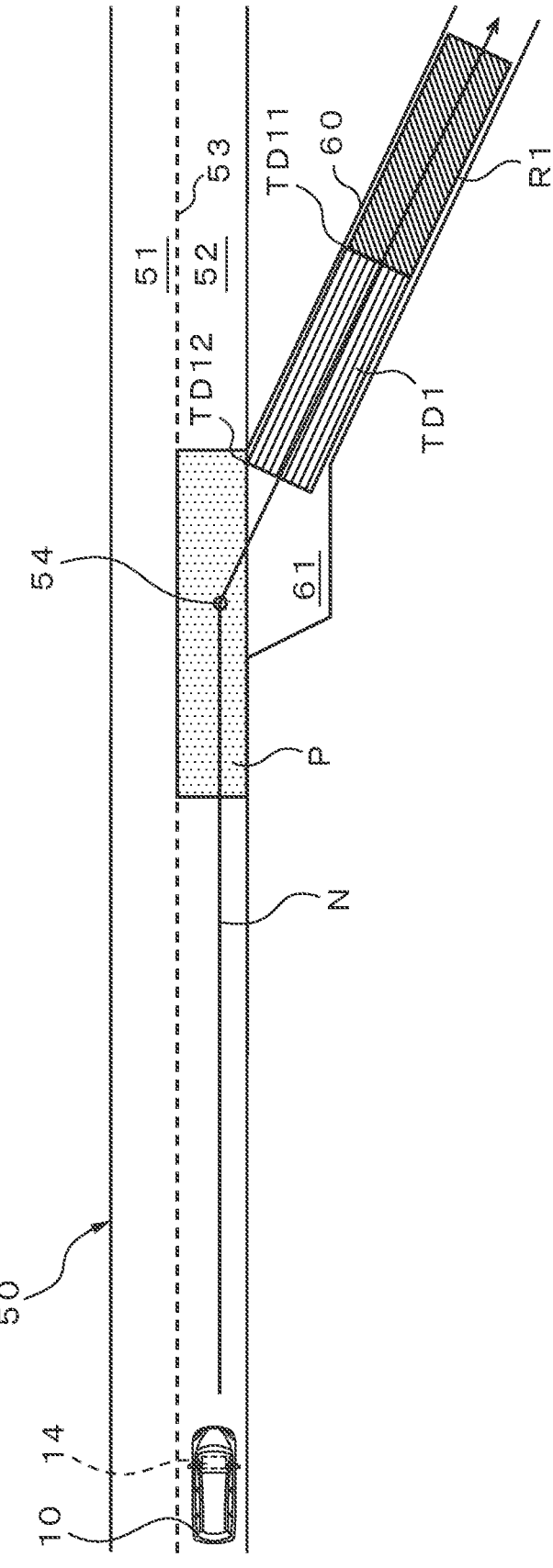
FIG. 3 is a diagram illustrating operation of the traveling lane planning device according to the first embodiment, in overview (3).

FIG. 1 to FIG. 3 are diagrams illustrating in overview the operation of the traveling lane planning device 14 of the first embodiment. Operation relating to vehicle control processing by the traveling lane planning device 14 disclosed herein will now be described in overview with reference to FIG. 1 to FIG. 3.

The vehicle 10 has a self-driving mode wherein the vehicle 10 is driven by automatic control (for example, driving mode with levels 3 to 5) and a manual driving mode in which the vehicle 10 is driven by manual control (for example, driving mode with levels 0 to 2). The vehicle 10 may be an autonomous vehicle.

In self-driving mode, the vehicle 10 travels on a lane 52 of a road 50 having lanes lane 51, 52. The traffic lane 51 and traffic lane 52 are divided by a lane marking line 53. The navigation route N representing the traveling route for the vehicle 10 shows that the vehicle 10 is to exit from the road 50 to the road 60 at a branching location 54.

Based on the current location of the vehicle, map information and the navigation route N, the traveling lane planning device 14 generates a traveling lane plan representing the traveling lane in which the vehicle 10 is traveling within the nearest driving zone of the navigation route N. The nearest driving zone is an example of a predetermined zone from the current location of the vehicle 10 in the traveling direction.

In the nearest driving zone, the traveling lane plan includes traveling of the vehicle 10 in the lane 52 of the road 50, movement of the vehicle 10 from the lane 52 of the road 50 to the lane 61 of the road 60 at the branching location 54, and traveling of the vehicle 10 in the lane 61 of the road 60.

The traveling lane planning device 14 sets a vehicle passage region P on the lane 52 where the vehicle 10 is scheduled to pass while the vehicle 10 moves between lanes. In the example shown in FIG. 1, the vehicle passage region P is set on the lane 52 within a predetermined range before, after and including the branching location 54.

The nearest driving zone includes an automatic control prohibited region R1 where driving of the vehicle by automatic control is not permitted, in the lane 61 on the road 60 on which the vehicle 10 will travel, and therefore the traveling lane planning device 14 sets a control transfer region TD1 for transfer of driving of the vehicle 10 from automatic control to manual control, on the lane 61 before the automatic control prohibited region R1. The control transfer region TD1 may have a fixed length, or it may be set based on the speed of the vehicle 10.

In the control transfer region TD1, driving of the vehicle 10 is transferred from automatic control to manual control. In the automatic control prohibited region R1, the driver drives the vehicle 10 by manual control.

In the example shown in FIG. 1, the location of the automatic control prohibited region R1 is near the branching location 54, and therefore part of the control transfer region TD1 overlaps with the vehicle passage region P of the road 50.

In the region where the vehicle passage region P in which movement of the vehicle 10 between lanes is to take place overlaps with the control transfer region TD1 in which driving of the vehicle 10 is to be transferred from automatic control to manual control, driving of the vehicle 10 by automatic control is not permitted from the viewpoint of ensuring safety of the vehicle 10.

Since the vehicle passage region P includes part of the control transfer region TD1, the traveling lane planning device 14 sets a new automatic control prohibited region R2 in the lane 52, so as to include the part of control transfer region TD1 that overlaps with the vehicle passage region P, as shown in FIG. 2.

Since the nearest driving zone also includes an automatic control prohibited region R2 in the lane 52 on the road 50 on which the vehicle 10 is traveling, the traveling lane planning device 14 newly sets a control transfer region TD2 on the lane 52 before the automatic control prohibited region R2, as shown in FIG. 2.

When this state continues, then the driver will need to initiate manual control of the vehicle 10 in the new control transfer region TD2 that has been set before the first control transfer region TD1.

Since the vehicle passage region P includes part of the control transfer region TD1, the traveling lane planning device 14 therefore shortens the length of the control transfer region TD1 so that the control transfer region TD1 is not included in the vehicle passage region P, thus newly setting the control transfer region TD1 (see FIG. 3).

As explained above, when the vehicle passage region P includes at least part of the control transfer region TD1, the traveling lane planning device 14 of the embodiment newly sets the control transfer region TD1 so that the control transfer region TD1 is not included in the vehicle passage region. The newly set automatic control prohibited region R2 and control transfer region TD2 are thus eliminated. The traveling lane planning device 14 allows movement of the vehicle 10 between lanes to be carried out by automatic control in the vehicle passage region P, thus alleviating the burden on the driver.

Figure 4:
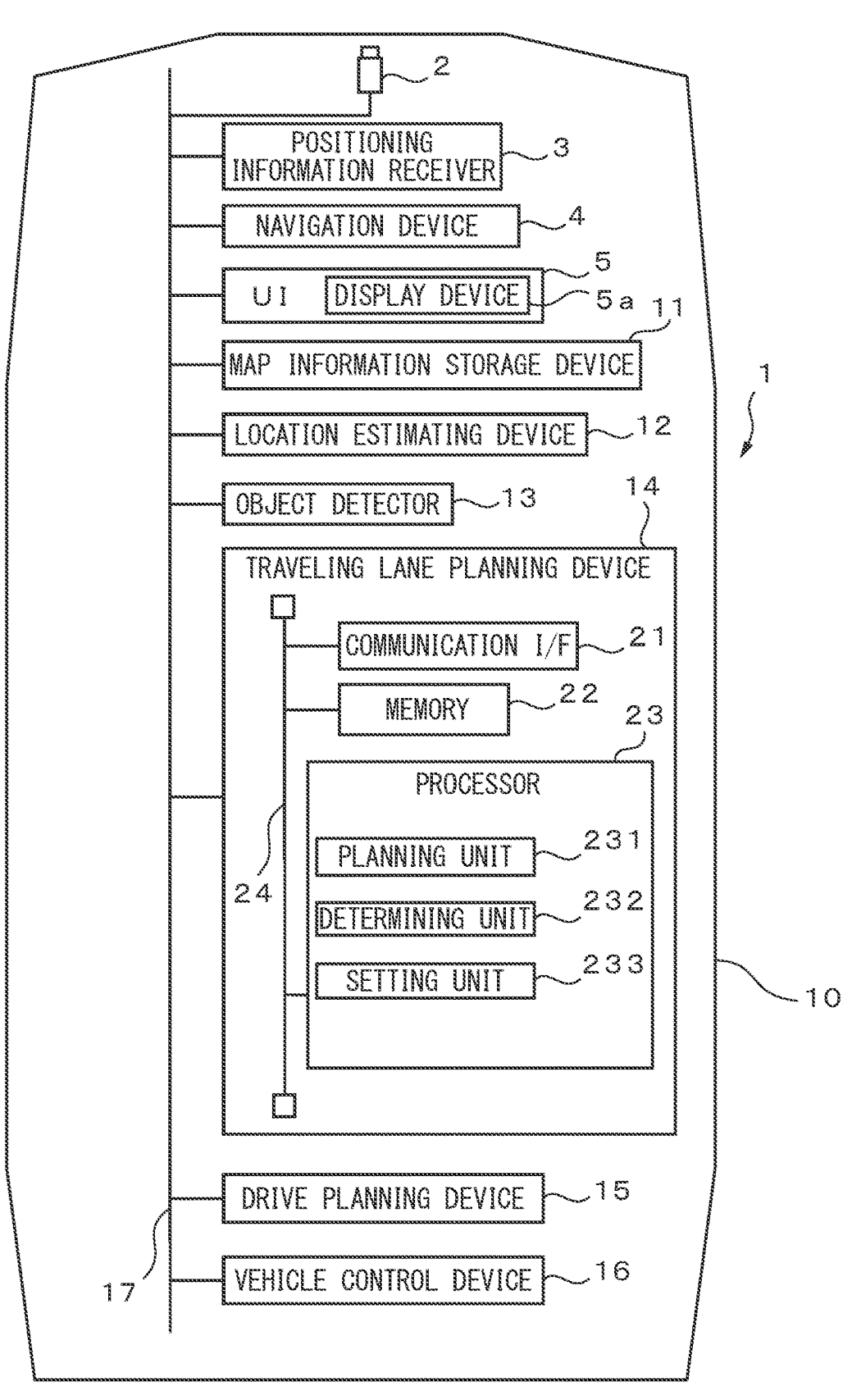
FIG. 4 is a general schematic drawing of a vehicle in which a vehicle control system is mounted that comprises the traveling lane planning device of the first embodiment.

FIG. 4 is a general schematic drawing of a vehicle 10 in which a vehicle control system 1 is mounted that has a traveling lane planning device 14. The vehicle 10 has a camera 2, a positioning information receiver 3, a navigation device 4, a user interface (UI) 5, a map information storage device 11, a location estimating device 12, an object detector 13, the traveling lane planning device 14, a drive planning device 15 and a vehicle control device 16. The vehicle 10 may also have a LiDAR sensor, as a distance sensor (not shown) for measurement of the distance of the vehicle 10 to surrounding objects. The vehicle control system 1 has at least a traveling lane planning device 14.

The camera 2, positioning information receiver 3, navigation device 4, UI 5, map information storage device 11, location estimating device 12, object detector 13, traveling lane planning device 14, drive planning device 15 and vehicle control device 16 are connected in a communicable manner through an in-vehicle network 17 that conforms to controller area network standards.

The camera 2 is an example of an imaging unit provided in the vehicle 10. The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 2 outputs the camera image and the camera image photograph time at which the camera image was taken, through the in-vehicle network 17 to the location estimating device 12 and object detector 13. The camera image is also used for processing at the location estimating device 12 to estimate the location of the vehicle 10. At the object detector 13, the camera image is used for processing to detect other objects surrounding the vehicle 10.

The positioning information receiver 3 outputs positioning information that represents the current location of the vehicle 10. The positioning information receiver 3 may be a GNSS receiver, for example. The positioning information receiver 3 outputs positioning information and the positioning information acquisition time at which the positioning information has been acquired, to the navigation device 4 and map information storage device 11 etc., each time positioning information is acquired at a predetermined receiving cycle.

Based on the navigation map information, the destination location of the vehicle 10 inputted through the UI 5, and positioning information representing the current location of the vehicle 10 inputted from the positioning information receiver 3, the navigation device 4 creates a navigation route N from the current location to the destination location of the vehicle 10. The navigation route N includes information relating to the locations of right turns, left turns, merging and branching. When the destination location has been newly set or the current location of the vehicle 10 has exited the navigation route N, the navigation device 4 creates a new navigation route N for the vehicle 10. Every time a navigation route N is created, the navigation device 4 outputs the navigation route N to the location estimating device 12 and the traveling lane planning device 14 etc., via the in-vehicle network 17.

The UI 5 is an example of the notification unit. The UI 5, controlled by the navigation device 4 and vehicle control device 16, notifies the driver of the vehicle 10 traveling information, or the control transfer request. A control transfer request is a request for transferring driving of the vehicle 10 from automatic control to manual control. The traveling information of the vehicle 10 includes information relating to the current location of the vehicle 10 and the current and future route of the vehicle 10, such as the navigation route. The UI 5 has a display device 5a such as a liquid crystal display or touch panel, for display of the traveling information. The UI 5 may also have an acoustic output device (not shown) to notify the driver of traveling information. The UI 5 also generates an operation signal in response to operation of the vehicle 10 by the driver. The UI 5 also has a touch panel or operating button, for example, as an input device for inputting operation information from the driver to the vehicle 10. The operation information may be, for example, a destination location, transit points, vehicle speed control transfer request acknowledgement, or control information for other vehicles 10. The UI 5 outputs the inputted operation information to the navigation device 4 and the vehicle control device 16 etc., via the in-vehicle network 17.

The map information storage device 11 stores wide-area map information for a relatively wide area (an area of 10 km² to 30 km², for example) that includes the current location of the vehicle 10. The map information preferably has high-precision map information including three-dimensional information for the road surface, information for the types and locations of structures and road features such as road lane marking lines, the legal speed limit for the road, and the automatic control prohibited region. The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is inputted from the positioning information receiver 3, the map information storage device 11 refers to the stored wide-area map information and outputs map information for a relatively narrow area including the current location represented by the positioning information (for example, an area of 100 m² to 10 km²), through the in-vehicle network 17 to the location estimating device 12, object detector 13, traveling lane planning device 14, drive planning device 15 and vehicle control device 16 etc.

The location estimating device 12 estimates the location of the vehicle 10 at the camera image photograph time, based on the road features surrounding the vehicle 10 represented in the camera image. For example, the location estimating device 12 compares lane marking lines identified in the camera image with lane marking lines represented in the map information inputted from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16 etc.

The object detector 13 detects objects around the vehicle 10 and their types (for example, vehicles) based on the camera image, for example. Objects also include other vehicles traveling around the vehicle 10. The object detector 13 tracks detected objects and determines the trajectories of the other objects. The object detector 13 identifies the traveling lanes in which the objects are traveling, based on the lane marking lines represented in the map information and the locations of the objects. The object detector 13 outputs object detection information which includes information representing the types of objects that were detected, information indicating their locations, and also information indicating their traveling lanes, to the traveling lane planning device 14 and drive planning device 15 etc.

The traveling lane planning device 14 carries out plan processing, determination processing and setting processing.

The traveling lane planning device 14 has a communication interface (IF) 21, a memory 22 and a processor 23 for this purpose. The communication IF 21, the memory 22 and the processor 23 are connected via a signal wire 24. The communication IF 21 has an interface circuit to connect the traveling lane planning device 14 with the in-vehicle network 17.

The memory 22 is an example of a memory unit, and it has a volatile semiconductor memory and a non-volatile semiconductor memory, for example. The memory 22 stores an application computer program and various data to be used for information processing carried out by the processor 23 of each device.

All or some of the functions of the traveling lane planning device 14 are functional modules driven by a computer program operating on the processor 23, for example. The processor 23 has a planning unit 231, a determining unit 232 and a setting unit 233. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. Operations carried out by the traveling lane planning device 14 are described below.

At a driving plan creation time set with a predetermined cycle, the drive planning device 15 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The drive planning device 15 preferably creates a driving plan within predetermined constraints. The predetermined constraints may be upper limits for acceleration, deceleration and angular acceleration, for example. The cycle in which the driving plan is created is preferably shorter than the cycle in which the traveling lane plan is created. The drive planning device 15 generates a driving plan to maintain a spacing of at least a predetermined distance between the vehicle 10 and other vehicles. When the traveling lane plan includes a lane change wherein the vehicle 10 is to move between lanes, but a spacing of at least a predetermined distance cannot be ensured between the vehicle 10 and another vehicle, the drive planning device 15 generates a driving plan for stopping the vehicle 10. The drive planning device 15 outputs the driving plan to the vehicle control device 16 for each driving plan generated.

The vehicle control device 16 has a self-driving mode wherein the vehicle 10 is driven by automatic control (for example, driving mode with levels 3 to 5) and a manual driving mode in which the vehicle 10 is driven by manual control (for example, driving mode with levels 0 to 2).

When the vehicle 10 is driven in self-driving mode, the vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the drive power or brake level so as to match that steering angle, acceleration and angular acceleration. The vehicle control device 16 also outputs an automatic control signal corresponding to a set steering amount, to an actuator (not shown) that controls the steering wheel for the vehicle 10, via the in-vehicle network 17. The vehicle control device 16 also generates an automatic control signal corresponding to the set driving force, and outputs the control signal to a drive unit such as an engine or motor (not shown) of the vehicle 10, via the in-vehicle network 17. Alternatively, the vehicle control device 16 may output an automatic control signal corresponding to a set brake level to the brake (not shown) of the vehicle 10, via the in-vehicle network 17.

When the vehicle 10 is to be operated in manual driving mode, the vehicle control device 16 generates a manual control signal to control operation of the vehicle 10 such as steering, actuation and braking based on driver operation, and outputs the manual control signal to an actuator for actuation of the steering wheel, and to a drive unit or brake, via the in-vehicle network 17.

For FIG. 4, the map information storage device 11, location estimating device 12, object detector 13, traveling lane planning device 14, drive planning device 15 and vehicle control device 16 were explained as separate devices (ECUs, for example), but all or some of them may be constructed in a single device.

For FIG. 4, the planning unit 231, determining unit 232 and setting unit 233 may also be included in a single traveling lane planning device 14, or the planning unit 231 and the determining unit 232 and setting unit 233 may be included in separate devices.

Figure 5:
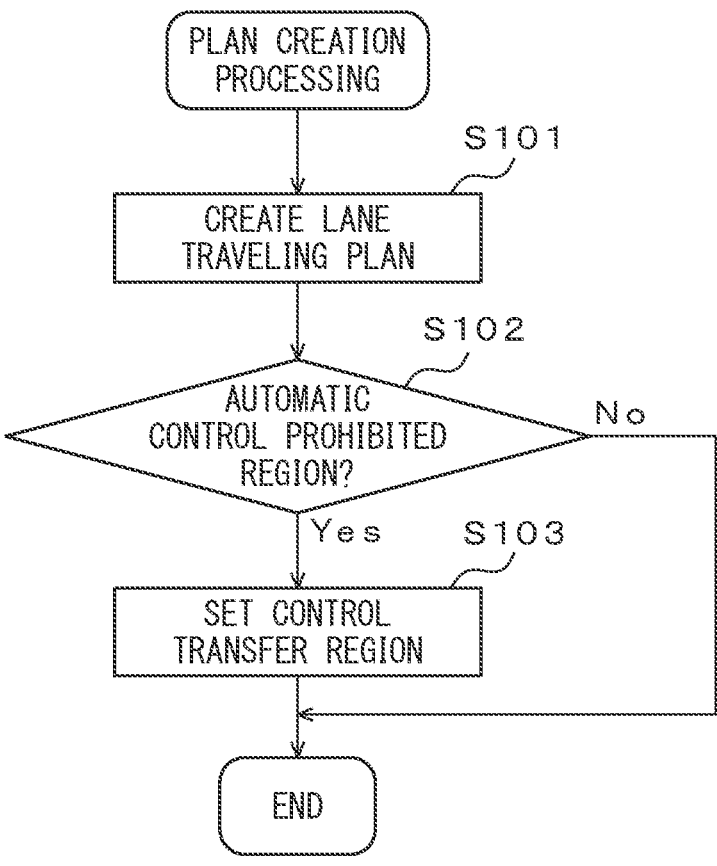
FIG. 5 is an example of an operation flow chart for plan creation processing by the traveling lane planning device of the first embodiment.

FIG. 5 is an example of an operation flow chart for plan creation processing by the traveling lane planning device 14 of the first embodiment. Plan creation processing by the traveling lane planning device 14 will be described with reference to FIG. 5. The traveling lane planning device 14 carries out plan creation processing according to the operation flow chart shown in FIG. 5, at a traveling lane-planning creation time set within a predetermined cycle.

First, the planning unit 231 generates a traveling lane plan showing the scheduled traveling lane in which the vehicle 10 is to travel, in the nearest driving zone (for example, 10 km) selected from the navigation route N (step S101). As an example, the planning unit 231 selects a lane on the road on which the vehicle 10 is traveling, based on the map information, navigation route N, surrounding environment information and the current location of the vehicle 10, and generates a traveling lane plan (step S101). For example, the planning unit 231 creates a traveling lane plan for the vehicle 10 to travel on a traffic lane other than a passing traffic lane. Each time a traveling lane plan is created, the planning unit 231 outputs the traveling lane plan to the drive planning device 15. The planning unit 231 is an example of the vehicle control device.

The planning unit 231 also determines whether or not a lane change is necessary within the nearest driving zone selected from the navigation route N, based on the traveling lane plan, the map information, the navigation route N and the current location of the vehicle 10, and generates a lane change plan in accordance with the assessment results. Specifically, the planning unit 231 determines whether or not a lane change is necessary for moving to a traffic lane toward the destination location of the vehicle 10, based on the navigation route N and the current location of the vehicle 10. It is determined whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out. The planning unit 231 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. When a lane change plan has been generated, the planning unit 231 outputs the traveling lane plan with the added lane change plan to the drive planning device 15.

When a lane change plan has been generated, the planning unit 231 sets a vehicle passage region on the traveling lane where the vehicle 10 is scheduled to pass while the vehicle 10 moves between lanes.

The determining unit 232 then determines whether or not an automatic control prohibited region where driving of the vehicle 10 by automatic control is not permitted is included in the traveling lane in which the vehicle 10 is traveling in the nearest driving zone (step S102). For example, the planning unit 231 refers to map information and determines whether or not an automatic control prohibited region is included in the traveling lane in which the vehicle 10 is traveling. The determining unit 232 is an example of a first determining unit.

The automatic control prohibited region may be a region with terrain that does not allow safe operation control of the vehicle 10 by the vehicle control device 16 in self-driving mode, a region not maintained in the high-precision map, or a region temporarily prohibited from travel of the vehicle 10 by automatic control. A region with terrain that does not allow safe operation control of the vehicle by the vehicle control device 16 may be terrain with a curve having a large curvature radius, terrain with a large slope, terrain that includes road markings such as stop lines, terrain that includes an intersection, terrain that includes a bus stop, terrain where the road on which the vehicle is traveling merges with other road and the merge zone for merging with the other road is short, terrain where the road is too narrow to allow safe control of vehicle operation by the vehicle control device 16, or terrain wide enough to allow parallel travel of multiple vehicles but without lane marking lines. A region not represented in the high-precision map may be a region ahead of a toll gate on a motorway, or a service area or parking area. A region temporarily prohibited from vehicle travel by automatic control may be a construction zone or a region flagged with a falling object warning.

When an automatic control prohibited region is included (step S102—Yes), the setting unit 233 sets a control transfer region for transferring driving of the vehicle 10 from automatic control to manual control, on the traveling lane before the automatic control prohibited region (step S103), and the series of processing steps is complete.

When no automatic control prohibited region is included (step S102—No), the series of processing steps is complete.

In the example shown in FIG. 1, in the nearest driving zone selected from the navigation route N, the traveling lane plan includes traveling of the vehicle 10 in the lane 52 of the road 50, movement of the vehicle 10 from the lane 52 of the road 50 to the lane 61 of the road 60 at the branching location 54, and traveling of the vehicle 10 in the lane 61 of the road 60.

Since movement of the vehicle 10 from the lane 52 to the lane 61 is to occur, the planning unit 231 sets a branching location 54. The branching location 54 may be, for example, the intersection between the center line of the lane 52 and an extension line of the center line of the lane 61 drawn toward the lane 52.

The planning unit 231 also sets a vehicle passage region P on the lane 52, so as to include the branching location 54. The vehicle passage region P is a region on the lane 52 where the vehicle 10 is scheduled to pass while the vehicle 10 moves from the lane 52 to the lane 61. The vehicle passage region P is set on the lane 52 within a predetermined range before, after and including the branching location 54. The predetermined range may be set as a fixed range, or it may be set based on the speed of the vehicle 10.

The setting unit 233 sets the control transfer region TD1 before the automatic control prohibited region R1 of the road 60. The end TD11 on the traveling direction end of the control transfer region TD1 matches the end at the front of the automatic control prohibited region R1. The control transfer region TD1 is the area between the end TD11 and the front end TD12, in the traveling direction. The length of the control transfer region TD1 may be a fixed length, or it may be decided based on the speed of the vehicle 10.

According to the embodiment, the control transfer region TD1 has a variable section A2 where a change in length is allowed, and a non-variable section A1 where change in length is not allowed, as shown in FIG. 1. The non-variable section A1 is situated at the automatic control prohibited region R1 side, and the variable section A2 is situated at the front end in the traveling direction of the vehicle 10.

When the vehicle 10 is in self-driving mode, the vehicle control device 16 notifies the driver in the variable section A2 via the UI 5 that driving of the vehicle 10 by automatic control is to end. The vehicle control device 16 also notifies the driver of a control transfer request for transfer of driving of the vehicle 10 from automatic control to manual control, via the UI 5. Upon acknowledgement of the control transfer request by the driver, the vehicle control device 16 may transfer driving of the vehicle 10 from automatic control to manual control.

When the driver has executed predetermined operation of a steering wheel (not shown), brake pedal, (not shown) or accelerator pedal (not shown), the vehicle control device 16 determines that the control transfer request has been acknowledged by the driver. The vehicle control device 16 also determines that the control transfer request has been acknowledged by the driver when a predetermined operation by the driver has been executed through the UI 5.

In the non-variable section A1, the vehicle control device 16 transfers driving of the vehicle 10 from automatic control to manual control. For example, the vehicle control device 16 notifies the driver, via the UI 5, that driving of the vehicle 10 is to be transferred from automatic control to manual control, and after elapse of a predetermined time (such as 10 seconds), then transfers driving of the vehicle 10 from automatic control to manual control. At the point when the vehicle 10 has reached the automatic control prohibited region R1, the vehicle 10 is in manual driving mode.

The non-variable section A1 has a fixed length (such as 300 m). The length of the variable section A2 can be decided based on the speed of the vehicle 10. The length of the variable section A2 can be calculated as the product of the speed set by the driver or the speed limit for the road, and a predetermined time (such as 4 seconds).

In the example shown in FIG. 1, part of the end TD12 section of the control transfer region TD1 overlaps with the lane 52 of the road 50. Part of the end TD12 section of the control transfer region TD1 is included in the vehicle passage region P.

Figure 6:
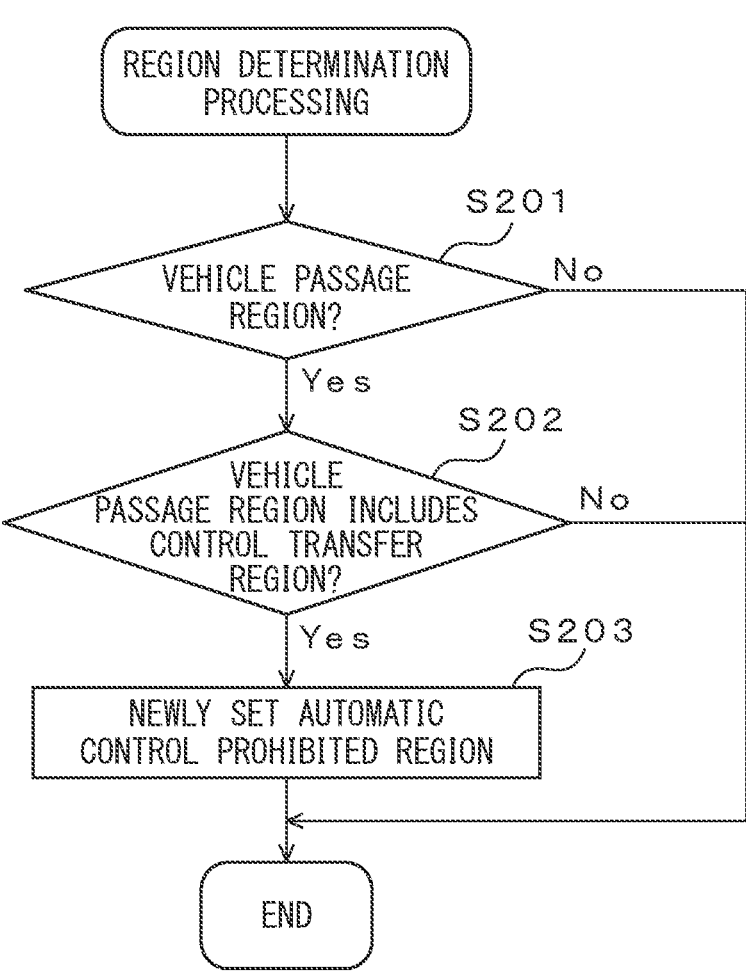
FIG. 6 is an example of an operation flow chart for region determination processing by the traveling lane planning device of the first embodiment.

FIG. 6 is an example of an operation flow chart for region determination processing by the traveling lane planning device 14 of the first embodiment. Region determination processing by the traveling lane planning device 14 will be described with reference to FIG. 6. After the plan creation processing described above, the traveling lane planning device 14 carries out region determination processing according to the operation flow chart shown in FIG. 6.

First, the determining unit 232 determines whether or not a vehicle passage region is included in the nearest driving zone generated by the traveling lane plan (step S201).

When a vehicle passage region is included (step S201—Yes), the determining unit 232 determines whether or not the vehicle passage region includes at least part of the control transfer region on the traveling lane in which the vehicle 10 is scheduled to pass (step S202). The determining unit 232 is an example of a second determining unit.

When the vehicle passage region includes at least part of the control transfer region (step S202—Yes), the setting unit 233 newly sets the automatic control prohibited region so as to include the vehicle passage region (step S202), and the series of processing steps is complete.

When the vehicle passage region is not included (step S201—No), or when the vehicle passage region does not include the control transfer region (step S202—No), the series of processing steps is complete.

In the example shown in FIG. 1, in the region where the vehicle passage region P in which movement of the vehicle 10 between lanes is to take place overlaps with the control transfer region TD1 in which driving of the vehicle 10 is to be transferred from automatic control to manual control, driving of the vehicle 10 by automatic control is not permitted from the viewpoint of ensuring safety of the vehicle 10.

The setting unit 233 newly sets the automatic control prohibited region R2 in the lane 52, so as to include the part of control transfer region TD1 that overlaps with the vehicle passage region P, as shown in FIG. 2. The setting unit 233 may also newly set the automatic control prohibited region R2 in the lane 52 so as to include the entire vehicle passage region P.

By the plan creation processing shown in FIG. 5, the new control transfer region TD2 for transfer of driving of the vehicle 10 from automatic control to manual control is set on the lane 52 before the new automatic control prohibited region R2. The aforementioned explanation regarding the control transfer region TD1 also applies as appropriate for the control transfer region TD2.

Figure 7:
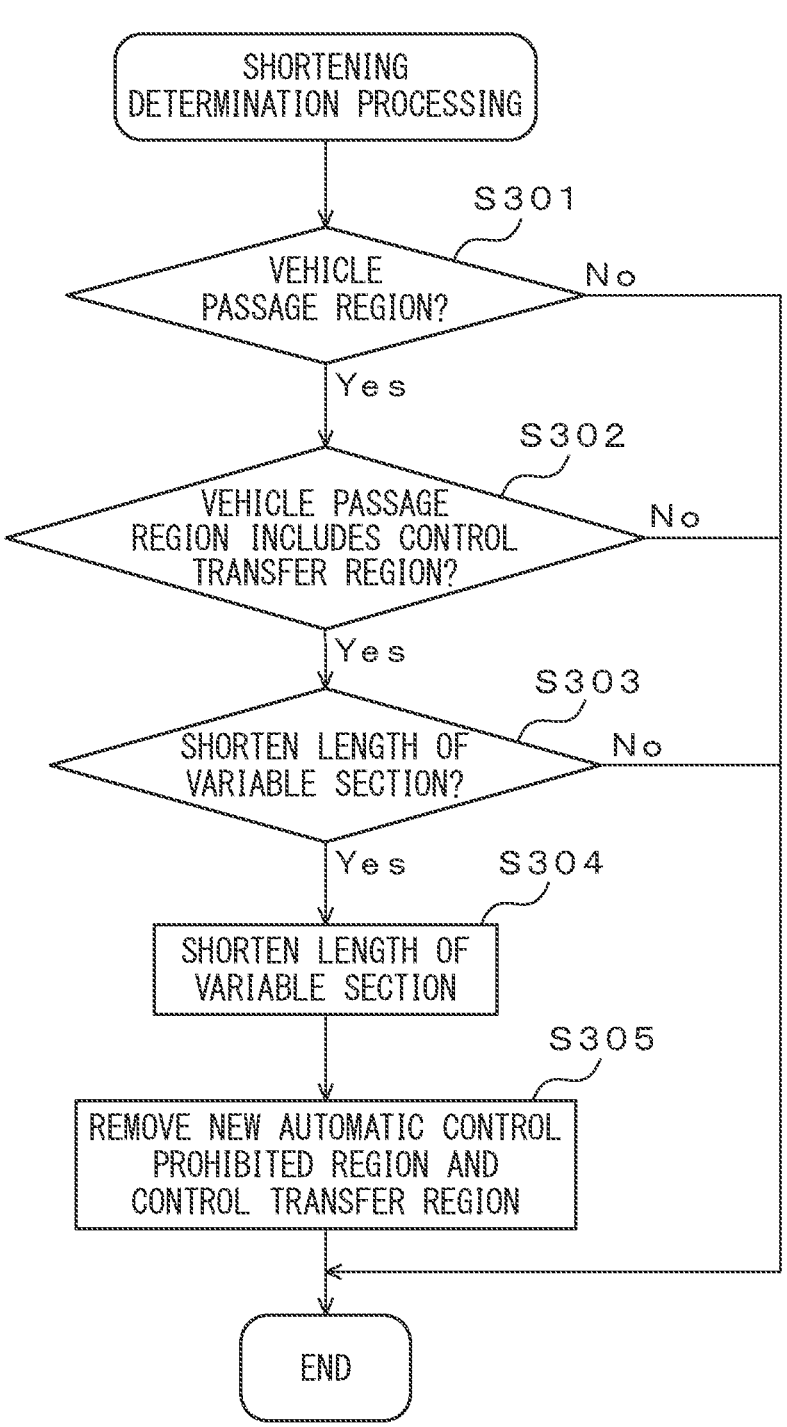
FIG. 7 is an example of an operation flow chart for shortening determination processing by the traveling lane planning device of the first embodiment.

FIG. 7 is an example of an operation flow chart for shortening determination processing by the traveling lane planning device 14 of the first embodiment. Shortening determination processing by the traveling lane planning device 14 will be described with reference to FIG. 7. After the region determination processing described above, the traveling lane planning device 14 carries out shortening determination processing according to the operation flow chart shown in FIG. 7.

First, the determining unit 232 determines whether or not a vehicle passage region is included in the nearest driving zone generated by the traveling lane plan (step S301).

When a vehicle passage region is included (step S301—Yes), the determining unit 232 determines whether or not the vehicle passage region includes at least part of the control transfer region on the traveling lane in which the vehicle 10 is scheduled to pass (step S302).

When a vehicle passage region includes at least part of the control transfer region (step S302—Yes), the determining unit 232 determines whether or not the length of the variable section can be shortened so that the control transfer region is not included in the vehicle passage region (step S303).

When the length of the variable section can be shortened so that the control transfer region is not included in the vehicle passage region (step S303—Yes), the setting unit 233 shortens the length of the variable section so that the control transfer region is not included in the vehicle passage region (step S304).

The setting unit 233 then removes the new automatic control prohibited region and control transfer region (step S305), and the series of processing steps is complete.

When a vehicle passage region is not included (step S301—No), the vehicle passage region does not include a control transfer region (step S302—No) or the length of the variable section cannot be shortened so that the control transfer region is not included in the vehicle passage region (step S303—No), the series of processing steps is complete.

In the example shown in FIG. 1, the length of the part of the control transfer region TD1 overlapping with the vehicle passage region P is shorter than the length of the variable section A2 of the control transfer region TD1. The determining unit 232 therefore determines that the length of the variable section A2 of the control transfer region TD1 can be shortened so that the control transfer region TD1 is not included in the vehicle passage region P. The length of the control transfer region TD1 may also be the length along the center line of the lane.

As shown in FIG. 3, the setting unit 233 newly sets the control transfer region TD1 by moving the location of the front end TD12 in the traveling direction toward the traveling direction, thus shortening the length of the variable section A2 so that the control transfer region TD1 is not included in the vehicle passage region P.

When the length of the section of the control transfer region TD1 overlapping with the vehicle passage region P is longer than the length of the variable section A2 of the control transfer region TD1, the determining unit 232 determines that setting is not possible so that the control transfer region TD1 is not included in the vehicle passage region P. When a predetermined reference length for the length of the variable section A2 cannot be ensured by shortening the variable section A2, the determining unit 232 may determine that setting is not possible so that the control transfer region TD1 is not included in the vehicle passage region P.

The setting unit 233 removes the new automatic control prohibited region R2 and control transfer region TD2, as shown in FIG. 3. The driver is no longer notified of the control transfer request in the control transfer region TD2.

As explained above, when the vehicle passage region includes at least part of the control transfer region, the traveling lane planning device of the embodiment shortens the length of the variable section in order to shorten the length of the control transfer region so that the control transfer region is not included in the vehicle passage region. This results in removal of the new automatic control prohibited region, thereby allowing the vehicle to move between lanes by automatic control in the vehicle passage region. Removal of the new control transfer region also allows the traveling lane planning device to alleviate burden on the driver.

Operation of the traveling lane planning device 14 of the second and third embodiments disclosed herein will now be explained with reference to FIGS. 8 to 12. The explanation of the first embodiment is to be applied for any aspects of these other embodiments that are not explained here.

For operation of the traveling lane planning device 14 of the second and third embodiments, the construction of the control transfer region and the conditions for determining whether or not the control transfer region can be shortened differ from the explanation of the first embodiment.

Figure 8:
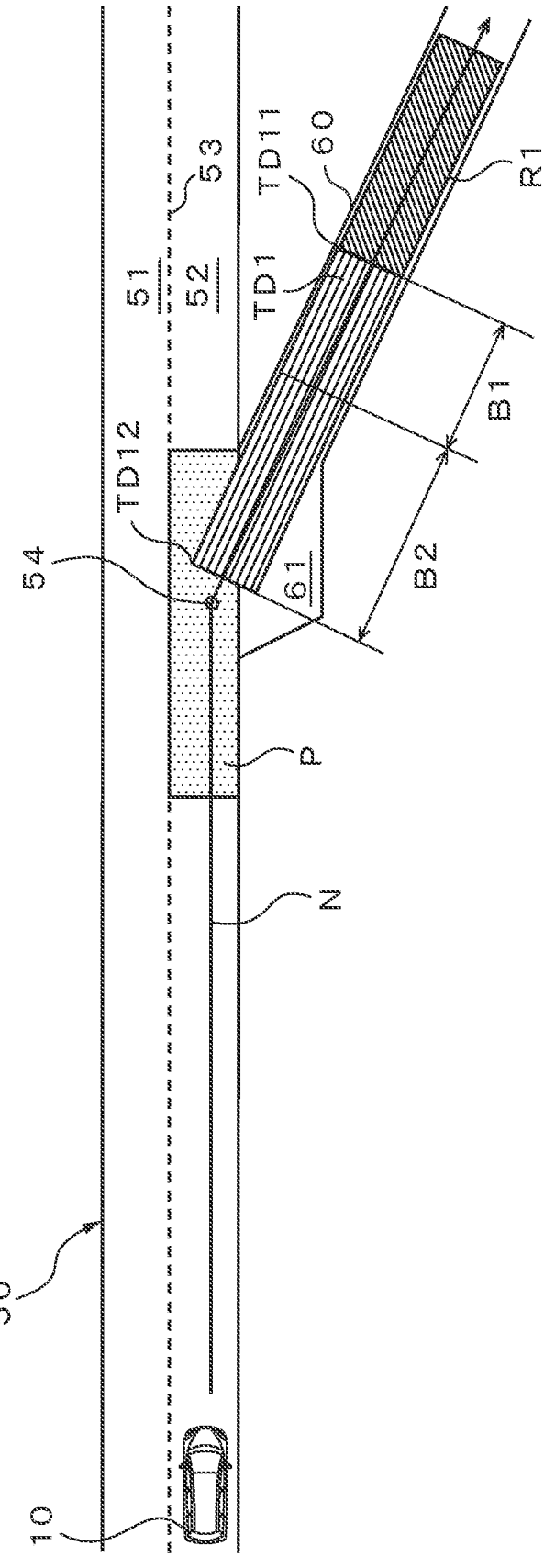
FIG. 8 is a diagram illustrating a control transfer region according to a second embodiment.

FIG. 8 is a diagram illustrating a control transfer region according to the second embodiment. The control transfer region TD1 has a control transfer notification region B2 in which the driver is notified that driving of the vehicle 10 is to be transferred from automatic control to manual control, and a control transfer execution region B1 in which transfer of driving of the vehicle 10 from automatic control to manual control is executed.

In the control transfer notification region B2, the vehicle control device 16 notifies the driver via the UI 5 that driving of the vehicle 10 by automatic control is to be ended. This allows the driver to recognize that driving of the vehicle 10 by manual driving mode is to be initiated. The vehicle control device 16 may also reduce the speed of the vehicle 10 in the control transfer notification region B2, from the viewpoint of aiding initiation of driving by the driver. The vehicle control device 16 may also notify the driver of a control transfer request for transfer of driving of the vehicle 10 from automatic control to manual control, via the UI 5. Upon acknowledgement of the control transfer request by the driver, the vehicle control device 16 may transfer driving of the vehicle 10 from automatic control to manual control.

In the control transfer execution region B1, the vehicle control device 16 transfers driving of the vehicle 10 from automatic control to manual control. For example, the vehicle control device 16 notifies the driver via the UI 5 that driving of the vehicle 10 is to be transferred from automatic control to manual control. After a predetermined time (for example, 10 seconds) has elapsed, the vehicle control device 16 transfers driving of the vehicle 10 from automatic control to manual control. At the point when the vehicle 10 has reached the automatic control prohibited region R1, driving of the vehicle 10 is in manual driving mode. When the vehicle 10 is already in manual driving mode at the point when the vehicle 10 has reached the control transfer execution region B1, then that driving mode is maintained.

The control transfer execution region B1 has a fixed length (such as 300 m). The length of the control transfer notification region B2 may also be set based on the speed of the vehicle 10. The length of the control transfer notification region B2 can be calculated as the product of the speed set by the driver or the speed limit for the road, and a predetermined time (such as 4 seconds).

The control transfer execution region B1 may also be a non-variable section. The control transfer notification region B2 has a non-variable section situated on the control transfer execution region B1 side and a variable section situated before the non-variable section.

Figure 9:
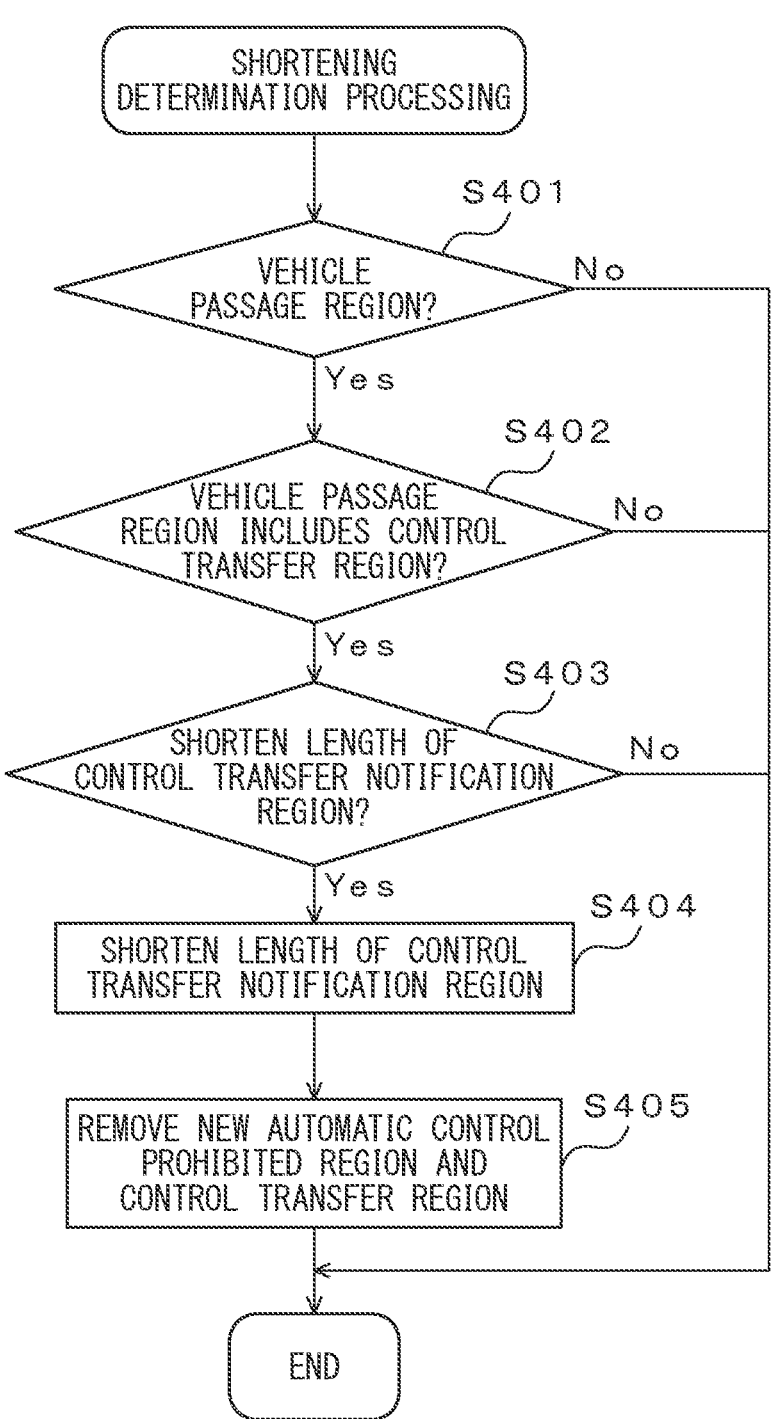
FIG. 9 is an example of an operation flow chart for shortening determination processing by the traveling lane planning device of the second embodiment.

FIG. 9 is an example of an operation flow chart for shortening determination processing by the traveling lane planning device 14 of the second embodiment. Shortening determination processing by the traveling lane planning device 14 will be described with reference to FIG. 9. After the region determination processing described above, the traveling lane planning device 14 carries out shortening determination processing according to the operation flow chart shown in FIG. 9.

The processing in steps S401, S402 and S405 is the same as the processing in steps S301, S302 and S305.

When a vehicle passage region includes at least part of the control transfer region (step S402—Yes), the determining unit 232 determines whether or not the length of the control transfer notification region can be shortened so that the control transfer region is not included in the vehicle passage region (step S403).

When it is possible to shorten the length of the control transfer notification region (step S403—Yes), the setting unit 233 shortens the length of the control transfer notification region so that the control transfer region is not included in the vehicle passage region (step S404). The other operations for shortening determination processing by the traveling lane planning device 14 are the same as for the first embodiment.

In the example shown in FIG. 8, the length of the part of the control transfer region TD1 overlapping with the vehicle passage region P is shorter than the length of the control transfer notification region B2. The determining unit 232 therefore determines that the length of the control transfer notification region B2 of the control transfer region TD1 can be shortened so that the control transfer region TD1 is not included in the vehicle passage region P.

As shown in FIG. 3, the setting unit 233 newly sets the control transfer region TD1 by moving the location of the front end TD12 in the traveling direction toward the traveling direction side, thus shortening the length of the control transfer notification region B2 so that the control transfer region TD1 is not included in the vehicle passage region P.

When the length of the section of the control transfer region TD1 overlapping with the vehicle passage region P is longer than the length of the control transfer notification region B2, the determining unit 232 determines that setting is not possible so that the control transfer region TD1 is not included in the vehicle passage region P. When a predetermined reference length for the length of the control transfer notification region B2 cannot be ensured by shortening the control transfer notification region B2, the determining unit 232 may determine that setting is not possible so that the control transfer region TD1 is not included in the vehicle passage region P.

The setting unit 233 removes the new automatic control prohibited region R2 and control transfer region TD2, as shown in FIG. 3. The driver is no longer notified of the control transfer request in the control transfer region TD2.

As explained above, when the vehicle passage region includes at least part of the control transfer region, the traveling lane planning device of the embodiment shortens the length of the control transfer notification region in order to shorten the length of the control transfer region so that the control transfer region is not included in the vehicle passage region. This results in removal of the new automatic control prohibited region, thereby allowing the vehicle to move between lanes by automatic control in the vehicle passage region. Removal of the new control transfer region also allows the traveling lane planning device to alleviate burden on the driver.

Operation of the traveling lane planning device of the third embodiment will now be explained. The setting unit 233 of the embodiment decides the length of the control transfer region TD1 based on the speed of the vehicle 10.

Figure 10:
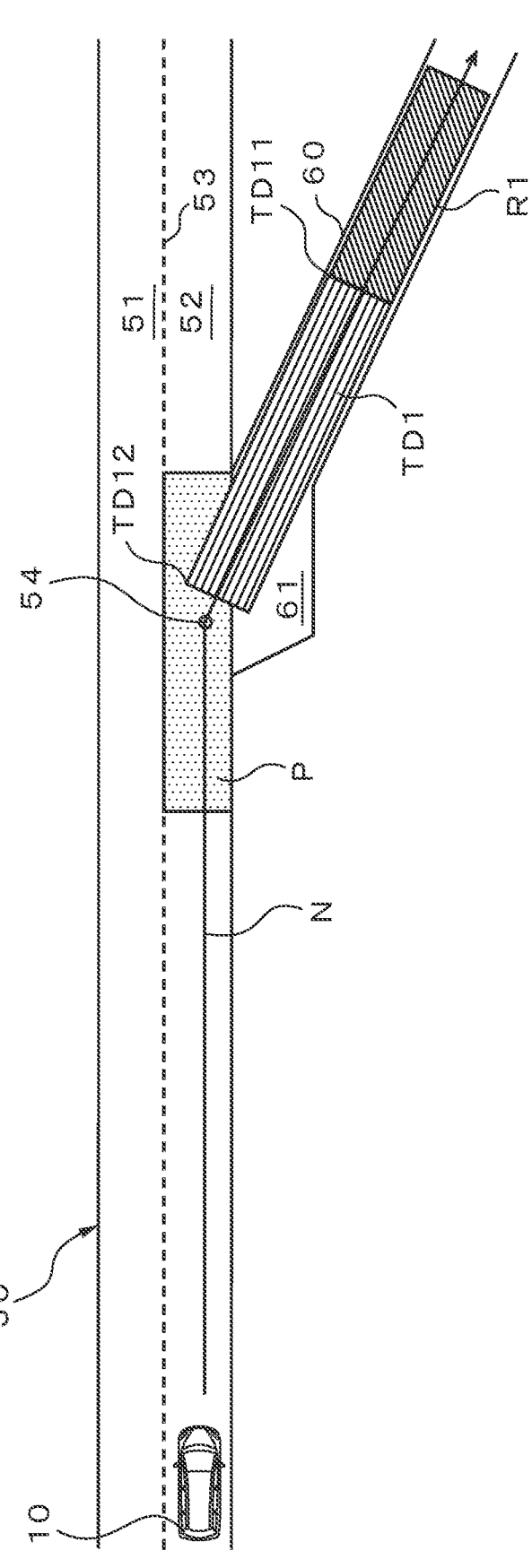
FIG. 10 is a diagram illustrating a control transfer region according to a third embodiment.

FIG. 10 is a diagram illustrating a control transfer region according to the third embodiment. The setting unit 233 decides the length of the control transfer region TD1 based on the speed of the vehicle 10. For example, the length of the control transfer region TD1 is calculated as the product of the speed set by the driver or the speed limit for the road, and a predetermined time (such as 4 seconds). The length of the control transfer region TD1 is longer with a faster speed set by the driver or a faster speed limit for the road. The length of the control transfer region TD1 may also be the sum of a predetermined reference length and the length decided based on the speed.

Figure 11:
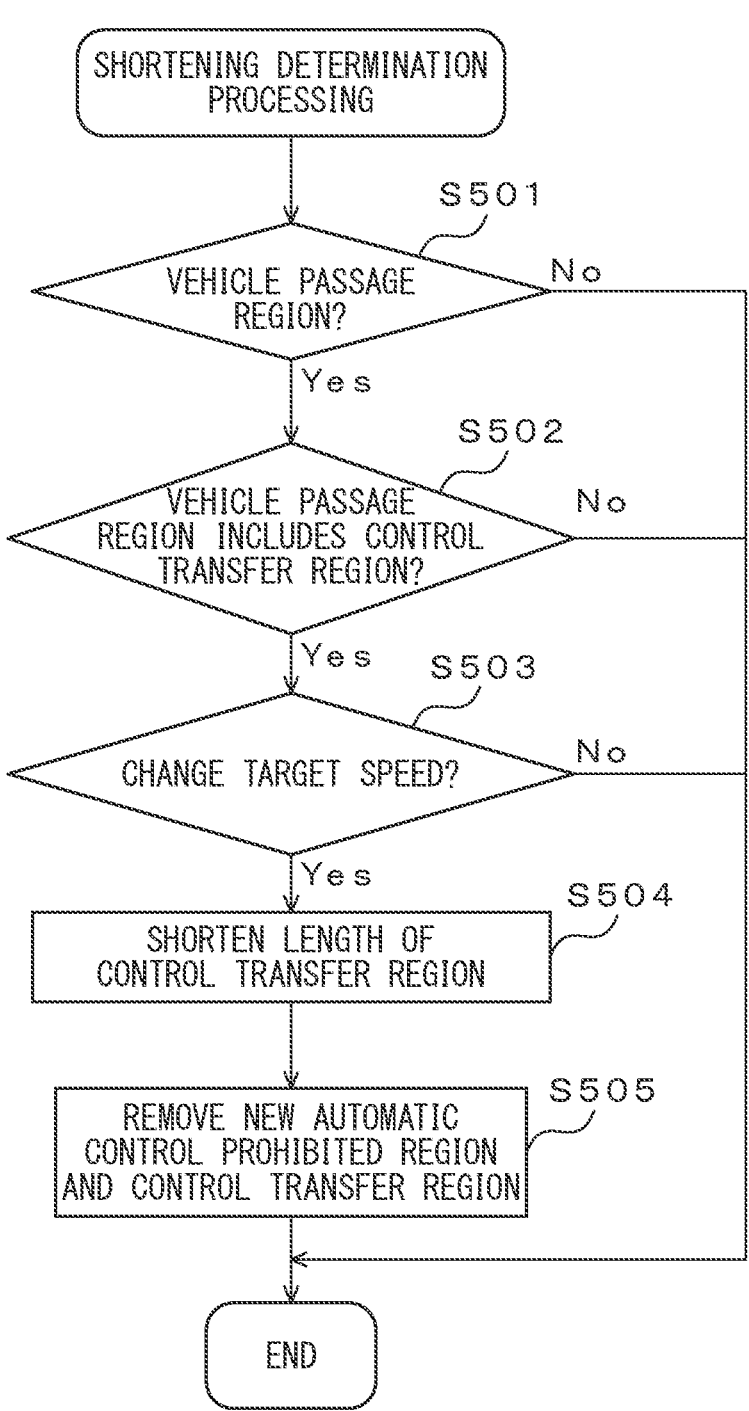
FIG. 11 is an example of an operation flow chart for shortening determination processing by the traveling lane planning device of the third embodiment.

FIG. 11 is a diagram illustrating operation for shortening determination processing by the traveling lane planning device 14 of the third embodiment. Shortening determination processing by the traveling lane planning device 14 will be described with reference to FIG. 11. After the region determination processing described above, the traveling lane planning device 14 carries out shortening determination processing according to the operation flow chart shown in FIG. 11.

The processing in steps S501, S502 and S505 is the same as the processing in steps S301, S302 and S305.

When a vehicle passage region includes at least part of the control transfer region (step S502—Yes), the determining unit 232 determines whether or not it is possible to change the speed of the vehicle to a target speed for the vehicle which is decided based on the length of the control transfer region calculated so that the control transfer region is not included in the vehicle passage region, before the vehicle reaches the control transfer region (step S503). Speed determination processing in step S503 will be explained in detail below with reference to FIG. 12.

When it is possible to change the speed of the vehicle (step S503—Yes), the setting unit 233 shortens the length of the control transfer region so that the control transfer region is not included in the vehicle passage region (step S504). The other operations for shortening determination processing by the traveling lane planning device 14 are the same as for the first embodiment.

Figure 12:
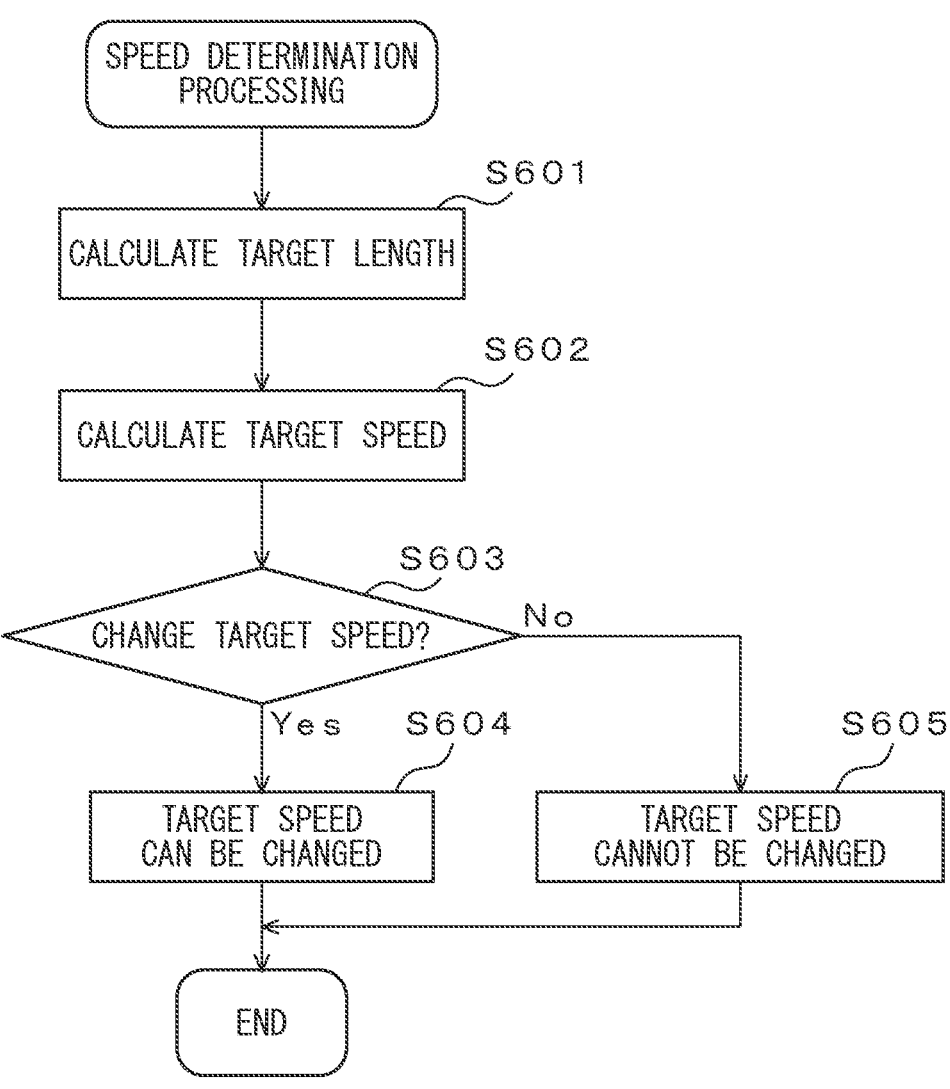
FIG. 12 is an example of an operation flow chart for speed determination processing by the traveling lane planning device of the third embodiment.

FIG. 12 is an example of an operation flow chart for speed determination processing by the traveling lane planning device of the third embodiment.

First, the determining unit 232 calculates a target length for the control transfer region with the length shortened so that the control transfer region is not included in a vehicle passage region (step S601).

The determining unit 232 then calculates a target speed for the vehicle 10, decided based on the target length (step S602). The target speed is the quotient of the target length divided by a predetermined time (such as 4 seconds). The predetermined time in this case is the time used for calculation of the length of the control transfer region TD1.

The determining unit 232 then determines whether or not it is possible to change the current speed of the vehicle 10 to the target speed before the vehicle 10 reaches the control transfer region with the target length (step S603).

When changing the current speed of the vehicle 10 to the target speed satisfies the constraints used when generating the driving plan, the determining unit 232 determines that change to the target speed is possible. When changing the current speed of the vehicle 10 to the target speed exceeds the constraints used when generating the driving plan, on the other hand, the determining unit 232 determines that change to the target speed is not possible. For example, when the degree of deceleration as deceleration to change the current speed of the vehicle 10 to the target speed exceeds the upper limit for deceleration used during generation of the driving plan, the determining unit 232 determines that change to the target speed is not possible.

When it is possible to change to the target speed (step S603—Yes), the determining unit 232 determines that change to the target speed is possible (step S604), and the series of processing steps is complete.

When it is not possible to change to the target speed (step S603—No), the determining unit 232 determines that change to the target speed is not possible (step S605), and the series of processing steps is complete.

Part of the end TD12 section of the control transfer region TD1 overlaps with the lane 52 of the road 50, as in the example shown in FIG. 10. Part of the end TD12 section of the control transfer region TD1 is included in the vehicle passage region P.

In the example shown in FIG. 10, the determining unit 232 calculates a target length for the control transfer region TD1 with the length shortened so that the transfer region TD1 does not include the vehicle passage region P. The target length may be the length between the end TD11 and the connecting point between the road 50 and road 60.

The determining unit 232 calculates the target speed to be the quotient of the target length divided by a predetermined time (such as 4 seconds). The determining unit 232 determines that changing the current speed of the vehicle 10 to the target speed satisfies the constraints used when generating the driving plan.

The determining unit 232 determines that it is possible to change the current speed of the vehicle 10 to the target speed before the vehicle 10 reaches the control transfer region TD1 with the target length.

As shown in FIG. 3, the setting unit 233 newly sets the control transfer region TD1 by moving the location of the front end TD12 in the traveling direction toward the traveling direction side, thus shortening the length of the control transfer region TD1 so that the control transfer region TD1 is not included in the vehicle passage region P.

The determining unit 232 notifies the vehicle control device 16 so as to change the speed of the vehicle 10 to the target speed. The vehicle 10 travels at the target speed, reaching the control transfer region TD1.

As explained above, when the vehicle passage region includes at least part of the control transfer region, the traveling lane planning device of the embodiment changes the speed of the vehicle to the target speed so as to shorten the length of the control transfer region so that the control transfer region is not included in the vehicle passage region. This results in removal of the new automatic control prohibited region, thereby allowing the vehicle to move between lanes by automatic control in the vehicle passage region. Removal of the new control transfer region also allows the traveling lane planning device to alleviate burden on the driver.

The vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the invention and its equivalents as laid out in the Claims.

For example, in the embodiments described above the automatic control prohibited region was situated on another road which branches from the traveling road on which the vehicle is traveling, but the location of the automatic control prohibited region is not so limited. For example, the automatic control prohibited region may be located on another road at a merging point where the traveling road on which the vehicle is traveling merges. The automatic control prohibited region may also be on the traveling road on which the vehicle is traveling. In this case, the automatic control prohibited region is located on an adjacent lane that is adjacent to the traveling lane in which the vehicle is traveling.

The invention claimed is:

1. A vehicle control device comprising:
a processor configured to:
    determine whether an automatic control prohibited region where driving of a vehicle by automatic control is not permitted is included on a traveling route of the vehicle, in a predetermined zone from a current location,
    upon determining that the automatic control prohibited region is included on the traveling route, set a control transfer region for transferring driving of the vehicle from automatic control to manual control on the traveling route before the automatic control prohibited region,
    determine whether a vehicle passage region for moving between lanes on the traveling route overlaps with at least part of the control transfer region,
    upon determining that the vehicle passage region overlaps with the at least part of the control transfer region, set a new automatic control prohibited region in addition to the automatic control prohibited region already included in the traveling route, so that the new automatic control prohibited region includes the vehicle passage region,
    after setting the new automatic control prohibited region, upon determining that the vehicle passage region overlaps with the at least part of the control transfer region and the control transfer region satisfies a predetermined condition, shorten a length of the control transfer region toward a traveling direction of the vehicle so that the control transfer region no longer overlaps with the vehicle passage region and remove the new automatic control prohibited region, and
    control the vehicle to automatically travel on the traveling route and, when the vehicle reaches the control transfer region, output a notification for a driver of the vehicle to prompt switching from the automatic control to the manual control.

2. The vehicle control device according to claim 1, wherein
    the control transfer region has a variable section in which change in length is allowed and a non-variable section in which change in length is not allowed, and
    the predetermined condition is that the length of the variable section can be shortened so that the control transfer region is not included in the vehicle passage region.

3. The vehicle control device according to claim 1, wherein
    the control transfer region has a control transfer notification region in which the notification is output for the driver is notifying that driving of the vehicle is to be transferred from the automatic control to the manual control, and a control transfer execution region in which execution is carried out for transfer of driving of the vehicle from the automatic control to the manual control, and
    the predetermined condition is that the length of the control transfer notification region can be shortened so that the control transfer region is not included in the vehicle passage region.

4. The vehicle control device according to claim 1, wherein
    the processor is further configured to decide the length of the control transfer region based on a speed of the vehicle, and the predetermined condition is that the speed of the vehicle can be changed to a target speed for the vehicle which is decided based on the length of the control transfer region calculated so that the control transfer region is not included in the vehicle passage region, before the vehicle reaches the control transfer region.

5. A computer-readable, non-transitory storage medium storing a computer program for controlling a vehicle, which causes a processor to execute a process, the process comprising:

determining whether an automatic control prohibited region where driving of a vehicle by automatic control is not permitted is included on a traveling route of the vehicle, in a predetermined zone from a current location of the vehicle;

upon determining that the automatic control prohibited region is included on the traveling route, setting a control transfer region for transferring driving of the vehicle from automatic control to manual control on the traveling route before the automatic control prohibited region;

determining whether a vehicle passage region for moving between lanes on the traveling route overlaps with at least part of the control transfer region;

upon determining that the vehicle passage region overlaps with the at least part of the control transfer region setting a new automatic control prohibited region in addition to the automatic control prohibited region already included in the traveling route, so that the new automatic control prohibited region includes the vehicle passage region;

after setting the new automatic control prohibited region, upon determining that the vehicle passage region overlaps with the at least part of the control transfer region and the control transfer region satisfies a predetermined condition, shortening a length of the control transfer region toward a traveling direction of the vehicle so that the control transfer region no longer overlaps with the vehicle passage region and removing the new automatic control prohibited region, and controlling the vehicle to automatically travel on the traveling route and, when the vehicle reaches the control transfer region, output a notification for a driver of the vehicle to prompt switching from the automatic control to the manual control.

6. A method for controlling a vehicle carried out by a vehicle control device and the method comprising:

determining whether t-an automatic control prohibited region where driving of a vehicle by automatic control is not permitted is included on a traveling route of the vehicle, in a predetermined zone from a current location of the vehicle;

upon determining that the automatic control prohibited region is included on the traveling route, setting a control transfer region for transferring driving of the vehicle from automatic control to manual control on the traveling route before the automatic control prohibited region;

determining whether a vehicle passage region for moving between lanes on the traveling route overlaps with at least part of the control transfer region;

upon determining that the vehicle passage region overlaps with the at least part of the control transfer region, setting a new automatic control prohibited region in addition to the automatic control prohibited region already included in the traveling route, so that the new automatic control prohibited region includes the vehicle passage region;

after setting the new automatic control prohibited region, upon determining that the vehicle passage region overlaps with the at least part of the control transfer region and the control transfer region satisfies a predetermined condition, shortening a length of the control transfer region toward a traveling direction of the vehicle so that the control transfer region no longer overlaps with the vehicle passage region and removing the new automatic control prohibited region; and controlling the vehicle to automatically travel on the traveling route and, when the vehicle reaches the control transfer region, output a notification for a driver of the vehicle to prompt switching from the automatic control to the manual control.

* * * * *